US00RE35805E

United States Patent [19]

Scholten et al.

[11] E Patent Number: Re. 35,805

[45] Reissued Date of Patent: May 26, 1998

[54] TWO-WAY ACTUATOR FOR A CHAIR HEIGHT ADJUSTMENT MECHANISM

[75] Inventors: Brian L. Scholten, Jenison; James E. Massey, Newaygo, both of Mich.

[73] Assignee: Steelcase Inc., Grand Rapids, Mich.

[21] Appl. No.: 443,845

[22] Filed: May 18, 1995

Related U.S. Patent Documents

Reissue of:

[64] Patent No.: 5,213,295
Issued: May 25, 1993
Appl. No.: 708,188
Filed: May 31, 1991

[51] Int. Cl.[6] ..... F16M 11/00

[52] U.S. Cl. ..... 248/161; 248/188.2; 297/345

[58] Field of Search ..... 248/161, 404, 248/157, 188.2; 297/199, 345, 347; 108/144; 74/519, 520, 512, 491

[56] References Cited

U.S. PATENT DOCUMENTS

| | | | |
|---|---|---|---|
| 569,809 | 10/1896 | Burke . | |
| 887,523 | 5/1908 | Ridlow | 74/512 X |
| 947,380 | 1/1910 | Fischer et al. . | |
| 1,719,435 | 7/1929 | Lowther . | |
| 2,869,392 | 1/1959 | Muller | 74/519 X |
| 3,146,592 | 9/1964 | Johnson . | |
| 3,539,142 | 11/1970 | Morand . | |
| 3,711,054 | 1/1973 | Bauer . | |
| 3,788,587 | 1/1974 | Stemmler | 248/404 X |
| 3,790,119 | 2/1974 | Bauer | 248/161 X |
| 3,880,465 | 4/1975 | Scheben | 248/161 X |
| 4,061,304 | 12/1977 | Schattmaier | 297/345 X |
| 4,373,692 | 2/1983 | Knoblauch et al. | 248/162.1 |
| 4,561,693 | 12/1985 | Brownlie et al. | 297/345 X |
| 4,658,660 | 4/1987 | Parker | 74/512 X |
| 4,817,760 | 4/1989 | Yamamura | 74/491 X |

*Primary Examiner*—Ramon O. Ramirez
*Attorney, Agent, or Firm*—Price, Heneveld, Cooper, DeWitt & Litton

[57] ABSTRACT

A two-way actuator device having a lever with a handle portion near a first end and a bearing portion near a second, opposing end for applying force to a responsive device. Two pivots are provided on the lever and located on opposing sides of the bearing portion. The pivots are biased so that the bearing portion moves in a direction opposite to the handle portion when the handle portion is moved in a first direction and the bearing portion moves in the same direction as a handle portion when the handle portion is moved in a second direction, opposite to the first direction.

40 Claims, 3 Drawing Sheets

TWO-WAY ACTUATOR FOR A CHAIR HEIGHT ADJUSTMENT MECHANISM

Matter enclosed in heavy brackets [ ] appears in the original patent but forms no part of this reissue specification; matter printed in italics indicates the additions made by reissue.

BACKGROUND OF THE INVENTION

The present invention relates to chair height adjustment mechanisms and more particularly to a control actuator for a pneumatic or gas spring adjustment mechanism.

A fairly wide variety of chair or seating vertical height adjustment mechanisms are currently available. A typical office chair, for example, includes a seat, a back portion and a support pedestal. The support pedestal usually incorporates a chair height adjustment mechanism which raises the seat height with respect to floor level. The pedestal or base may include threadably interconnected and relatively positionable elements. In the alternative, a pneumatic or gas spring is provided for height adjustment. The gas spring includes a piston rod connected to a piston which rides within a cylinder. A release pin extends from an outer end of the cylinder or housing through a seal. The release pin serves as an actuator for releasing or locking the piston in a desired set position and for setting the initial or unloaded chair height. An actuator handle or lever located under the seat cushion of the chair is provided to engage the release pin and selectively release or lock the height adjustment mechanism. The lever or control actuator is typically movable in one of an upward, downward, backward or forward direction. An example of a chair height adjustment mechanism incorporating a gas spring may be found in U.S. Pat. No. 3,711,054 entitled CONTINUOUSLY ADJUSTABLE LIFTING DEVICES and issued on Jan. 16, 1973 to Bauer.

Problems have been experienced with user operation of the control actuators. A user unfamiliar with the particular mechanism will not know which direction within which to move the height control lever or control actuator. If the actuator functions to control the release pin when it is pulled in the upward direction, the actuator handle may be broken or bent should the user place their full weight onto the handle and push downwardly.

SUMMARY OF THE INVENTION

In accordance with the present invention, the aforementioned problems are solved. [Essentially, a] *A two-way* control actuator is provided for [engaging] *actuating* a release pin or the like of a chair height adjustment mechanism. [The] *In one aspect, the* actuator includes an elongated lever having a handle portion and a bearing portion. Pivot means engage the lever when the handle portion is moved in a first direction so that the bearing portion moves in a predetermined direction. The pivot means also engage the lever at another point when the handle is moved in a second direction so that the bearing portion again moves in the predetermined direction. The release pin or control button of the height adjustment mechanism is engaged and actuated when the handle portion is moved in either of two directions.

In narrower aspects of the invention, the actuator device includes a plate defining an aperture through which the lever extends. The lever includes a pivot which engages the plate at the aperture when the handle is moved in the first direction. The plate and lever define another pivot which is operative when the handle is moved in the second direction. In a preferred form, the second pivot is defined by a generally hook shaped fulcrum extending through another aperture in the plate.

By virtue of the dual or two-way operation of the actuator in accordance with the present invention, problems heretofore experienced with bending or damage to the actuator handle are eliminated. A user can actuate the height control mechanism by pulling up or pushing down on the handle portion.

DESCRIPTION OF THE PREFERRED EMBODIMENT

Figure 1:
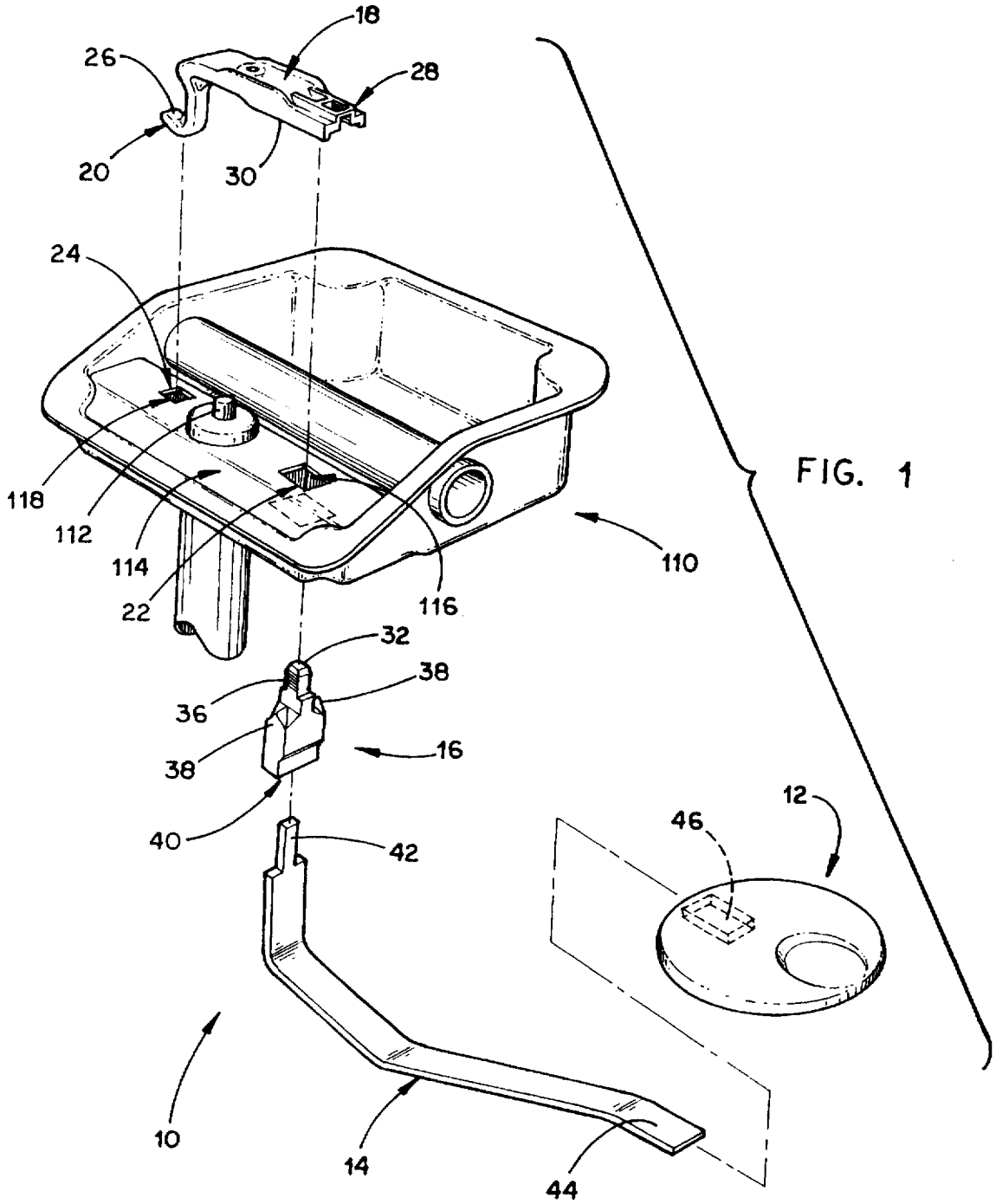
FIG. 1 is an exploded perspective view of a two-way actuator according to the present invention.

[An] *A control* actuator [device] in accordance with the present invention is illustrated in FIG. 1 and generally designated by the numeral 10. [Device] *Control actuator* 10 includes [a] *an elongated actuator* lever 11 having a grasp 12, an elongated handle portion 14, a fulcrum block or pivot member 16, a bearing bar *or intermediate portion* 18 and another pivot member in the form of a fulcrum hook *or configured end* 20. Handle portion 14 is generally L-shaped including a generally horizontal leg 15 and a generally vertical leg 17. [Actuator device] *Control actuator* 10 may be used with a height adjustable chair base 110, having a conventional height adjustment mechanism which is released for adjustment by depressing a control button or release pin 112. Base 110 includes a *pivot-forming structure member or* plate 114 which defines a pivot seat 22 at an aperture 116. Another pivot seat 24 is defined in chair base plate 110 by a second aperture 118. Aperture 118 receives fulcrum hook 20 at the end of the lever. Lever 11 extends through aperture 116.

Figure 3:
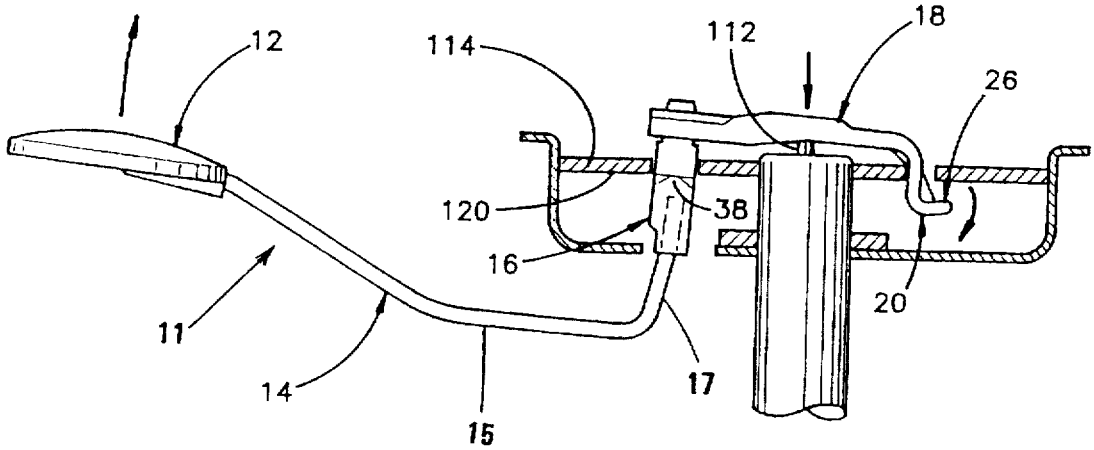
FIG. 3 is the view of FIG. 2 with the actuator manipulated in a first direction.
Figure 4:
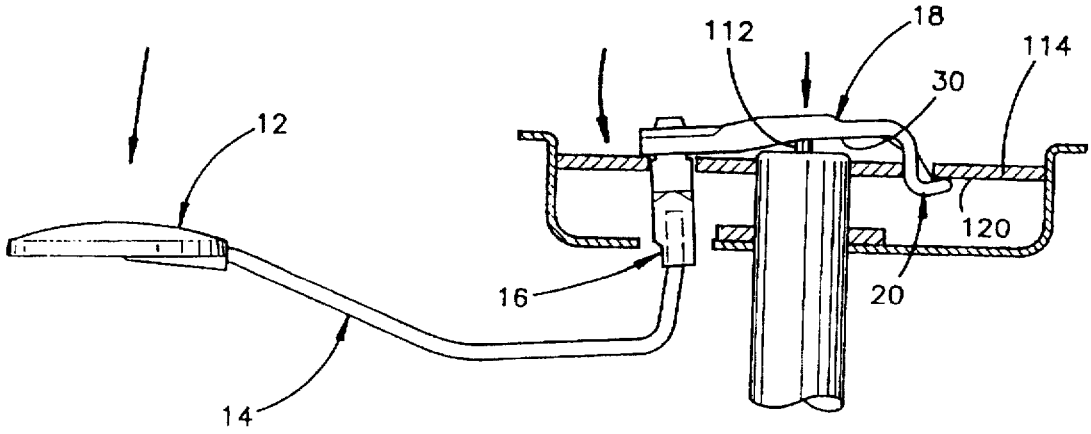
FIG. 4 is the view of FIG. 2 with the actuator manipulated in a second direction.

Fulcrum hook 20 is a generally hook shaped portion formed at one end of bearing bar 18. Fulcrum hook 20 has a leg 21 extending generally perpendicularly from bearing bar 18 to a flange 23 (FIG. 2) and a bearing surface 26 on flange 23, as best shown in FIG. 3. Base plate 114 has a bottom surface 120 which bearing surface 26 engages to define a pivot point for actuator 10 (FIGS. 2 and 4).

Figure 2:
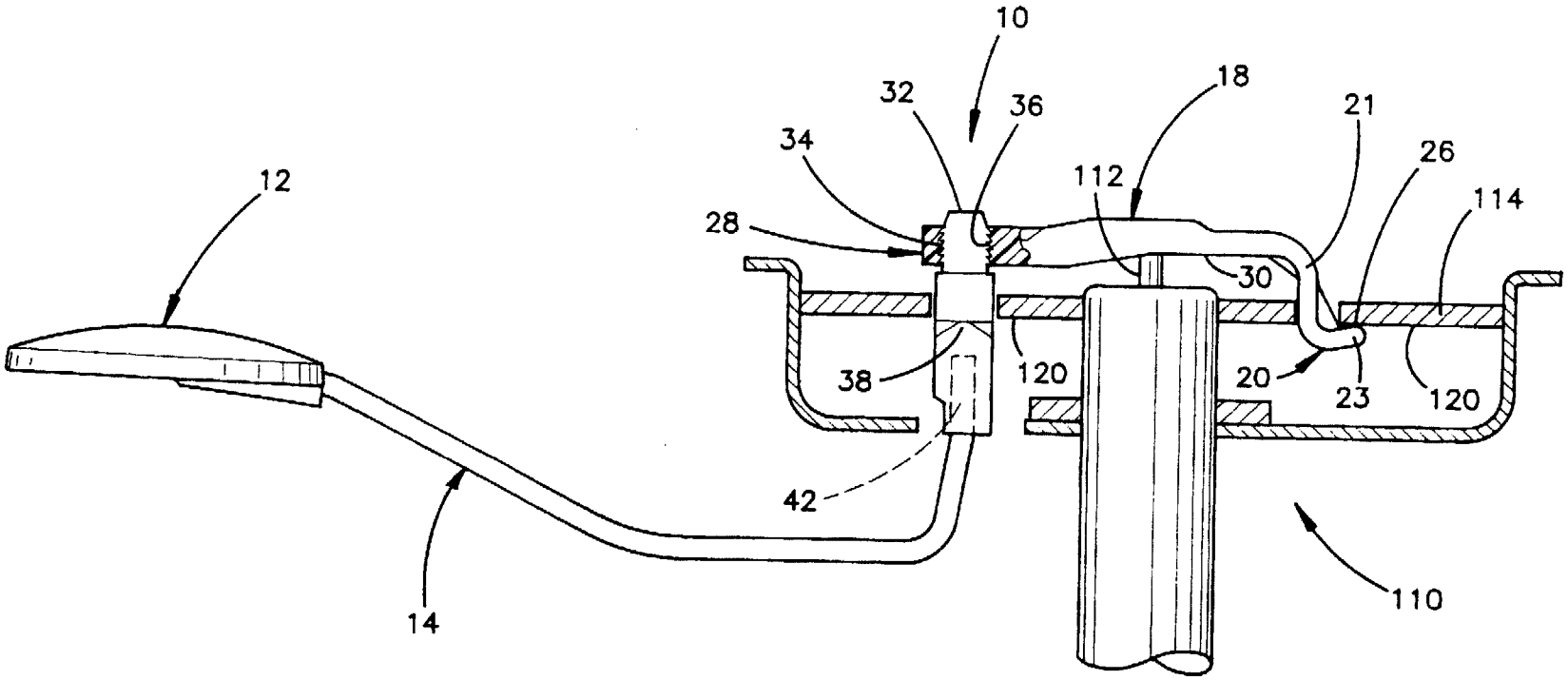
FIG. 2 is a partial sectional and partial rear elevational view of the actuator of FIG. 1.

Bearing bar 18 extends between fulcrum hook 20 and a connector 28 (FIG. 2). Bearing bar 18 also has a bearing surface 30 which engages pin 112 for applying pressure to and depressing the pin, releasing the height adjustment mechanism for adjusting the chair height. Fulcrum hook 20 and bearing bar 18 are preferably formed from a thirty-three percent glass filled nylon plastic material.

Connector 28 is adapted to engage and lock with a corresponding connector tang 32 which extends from fulcrum block 16 (FIG. 2). Connector 28, which defines an aperture through bearing bar 18, has a series of biased teeth or barbs 34 formed within the aperture. Tang 32 has a corresponding series of opposing or oppositely directed biased teeth or barbs 36 for cooperation and engagement with teeth 34 of connector 28. Tang 32 can be easily inserted into connector 28 because of the bias of teeth 34,36. However, tang 32 can not be withdrawn from connector 28 because of the engagement of teeth 36 with teeth 34 and the bias of teeth 34,36.

Fulcrum block 16 is preferably formed of a thirty-three percent glass filled nylon plastic. Block 16 has two fulcrum shoulders or pivot portions 38 on either side of tang 32 which define a pivot. Each fulcrum shoulder 38 has a generally wedge shape as shown, with the actual bearing point of the fulcrum being defined by the apex of each fulcrum shoulder 38. Tang 32 extends through aperture 116 of base plate 114 so that fulcrum shoulders 38 engage bottom surface 120 of base plate 114 (FIGS. 2 and 3). The point of engagement between shoulders 38 and bottom surface 120 defines pivot seat 22. Fulcrum block 16 also has a cavity 40, opposite to tang 32 for receiving one end of handle portion 14 (FIG. 2).

Handle portion 14 is preferably a stamped steel flat bar which is dimensioned suitably and formed of an alloy suitable to accommodate the moment forces generated by a user manipulating handle grasp 12. Handle portion 14 is most preferably formed from three-sixteenths inch by one-half inch chromium steel flat bar. Handle portion 14 also has a connector tang 42 formed at one end and dimensioned for a force fit with cavity 40, in fulcrum block 16. Handle grasp 12 is preferably injection molded with thermoplastic material, most preferably polypropylene. A mounting cavity 46 is molded into handle grasp 12 and dimensioned for a force fit with end 44 of handle portion 14.

[Actuator] *Control actuator* 10 is assembled by forcing end 44 of handle portion 14 into cavity 46 of handle grasp 12. Connector tang 42 of handle portion 14 is forced into cavity 40 of fulcrum block 16. Flange 23 of fulcrum hook 20 is inserted through aperture 118 of base plate 114 so that bearing bar 18 is positioned to overlay control button 112 with bearing surface 30 in contact with the control pin. Connector tang 32 of fulcrum block 16 is inserted through aperture 116 in base plate 114 and further through connector 28 of bearing bar 18 so that teeth 36 engage teeth 34, locking fulcrum block 16 to bearing bar 18.

In operation, pressure may be exerted on control button 112 and the control button depressed to release the seat height control mechanism for adjustment of seat height by lifting handle grasp 12 (FIG. 3). As handle grasp 12 is lifted, shoulders 38 of fulcrum block 16 bear against bottom surface 120 of base plate 114, causing a pivot action about pivot seat 22 whereby bearing bar 18 moves in a direction generally opposite to handle grasp 12. The force exerted in manipulating handle grasp 12 in an upward direction is transferred through the contact between bearing surface 30 of bearing bar 18 to depress the control pin and release the height adjustment mechanism.

The seat height adjustment mechanism may also be released by manipulation of handle grasp 12 in a downward direction to apply force to control button 112, depressing the control button and releasing the height adjustment mechanism (FIG. 4). As handle grasp 12 is manipulated in a downward direction, bearing surface 26 of second fulcrum hook 20 bears against bottom surface 120 of base plate 114 defining a pivot point about which *control* actuator 10 and specifically bearing bar 18 rotate. Bearing bar 18 moves in the same general direction as handle grasp 12 and handle portion 14. The force manipulating handle grasp 12 in a downward direction is transferred through the contact between bearing surface 30 of bearing bar 18 and the control button 112, to depress the control button and release the height adjustment mechanism.

While the present description of the invention is with regard to upward and downward movements in a vertical plane, it is understood that the embodiment shown in the drawings and described above is merely for illustrative purposes and is not intended to limit the scope of the invention. It is possible to rotate the plane of reference whereby backward and forward motions or side to side motions are generated in a horizontal plane for example. The actuation could pull or push a cable or secondary lever actuating devices, for example, instead of the button device or release pin specifically referred to above.

The above description is considered that of a preferred embodiment only. The invention and the scope of the invention are defined by the following claims as interpreted according to the principles of patent law.

The embodiments of the invention in which an exclusive property or privilege is claimed are defined as follows:

1. A control actuator for engaging a release member of a chair height adjustment mechanism, said actuator comprising:

an elongated actuator lever, said lever having a handle portion, a bearing portion and an end; and pivot means for pivoting said bearing portion in a predetermined direction when said handle portion is moved in a first direction and for pivoting said bearing portion in said predetermined direction when said handle portion is moved in a second direction, opposite said first direction.

2. A control actuator as defined by claim 1 wherein said actuator lever includes a generally L-shaped handle portion having a generally horizontal leg joined to a generally vertical leg.

3. A control actuator as defined in claim 2 wherein said lever bearing portion extends generally perpendicular to said vertical leg.

4. A control actuator as defined in claim 3 wherein said pivot means comprises a *structural* member defining an aperture, said vertical leg of said lever extending through said aperture, said pivot means further including a pivot *member* on said lever which engages said *structural* member when said handle portion is moved in said first direction.

5. A control actuator as defined in claim 4 wherein said pivot means engages the end of said lever when said handle [piston] *portion* moves in said second direction and said pivot moves away from said *structural* member.

6. A control actuator as defined in claim 5 wherein said *structural* member defines another aperture and wherein said end of said lever extends into said another aperture and said end is configured to engage said *structural* member and define a pivot point therewith when said handle portion moves in a said second direction.

7. A control actuator as defined in claim 6 wherein said handle portion is joined to said bearing portion by a connector block, said block defining said pivot.

8. A two-way actuator device comprising:

an elongated member having first and second opposing ends, a bearing portion near said second end for applying force to a responsive device and a handle portion adjacent said first end;

first pivot means for pivoting said elongated member so that said bearing portion moves in a direction generally opposite to said handle portion when said handle portion is manipulated in a first direction, said first pivot means being located between said handle portion and said bearing portion; and second pivot means for pivoting said elongated member so that said bearing portion moves in generally the same direction as said handle portion when said handle portion is manipulated in a second direction, said second direction being generally opposite to said first direction, said second pivot means being located opposite said bearing portion from said handle portion.

9. A device as defined by claim 8 wherein said first pivot means includes a first pivot fulcrum and a first pivot seat and wherein said second pivot means includes a second pivot fulcrum and a second pivot seat.

10. A device as defined in claim 9 wherein said elongated member has a neutral position from which it may be manipulated to a first position when said handle portion is manipulated in said first direction and from which it may be manipulated to a second position when said handle portion is manipulated in said second direction.

11. A device as defined in claim 10 wherein:

said first pivot fulcrum is located adjacent to said first pivot seat in said second direction from said first pivot seat when said elongated member is in said neutral position;

said elongated member rotates about a point of contact between said first pivot fulcrum and said first pivot seat when said handle portion is manipulated in said first direction, moving said elongated member to said first position; and said first pivot fulcrum moves in said second direction, away from said first pivot seat, when said handle portion is manipulated in said second direction, moving said elongated member to said second position, said first pivot fulcrum being spaced from said first pivot seat when said elongated member is in said second position.

12. A device as defined in claim 11 wherein:

said second pivot fulcrum is located adjacent to said second pivot seat in said second direction from said second pivot seat when said elongated member is in said neutral position;

said elongated member rotates about a point of contact between said second pivot fulcrum and said second pivot seat when said handle portion is manipulated in said second direction, moving said elongated member to said second position; and said second pivot fulcrum moves in said second direction, away from said second pivot seat when said handle portion is manipulated in said first direction, moving said elongated member to said first position, said second pivot fulcrum being spaced from said second pivot seat when said elongated member is in said first position.

13. A pneumatic height control mechanism for a chair, the mechanism being releasable for height adjustment by applying pressure to a control button, said mechanism comprising a bidirectional control actuator for applying pressure to the control button when the control actuator is manipulated in either of two opposing directions, said actuator including:

a lever having a handle portion adjacent a first end and a bearing portion near an opposite, second end;

first pivot means for pivoting said lever so that said bearing portion moves in a direction generally opposite to said handle portion when said handle portion is manipulated in a first direction, said first pivot means being located between said handle portion and said bearing portion; and second pivot means for pivoting said lever so that said bearing portion moves in generally the same direction as said handle portion when said handle portion is manipulated in a second direction, generally opposite to said first direction, said second pivot means being located opposite said bearing portion from said handle portion.

14. A mechanism as defined by claim 13 wherein said lever includes a first piece defining said handle portion and said first pivot means, a second piece defining said bearing portion and connection means for interconnecting said first pivot means with said bearing portion.

15. A pneumatic height control mechanism for a chair, the mechanism being releasable for height adjustment by applying pressure to a control button, said mechanism comprising a bidirectional control actuator for applying pressure to the control button when said control actuator is manipulated in either of two opposing directions, said actuator including:

a lever having a handle portion adjacent a first end and a bearing portion near an opposite, second end;

first pivot means for pivoting said lever so that said bearing portion moves in a direction generally opposite to said handle portion when said handle portion is manipulated in a first direction, said first pivot means being located between said handle portion and said bearing portion; and second pivot means for pivoting said lever so that said bearing portion moves in the same general direction as said handle portion when said handle portion is manipulated in a second direction, generally opposite to said first direction, said second pivot means being located opposite said bearing portion from said handle portion;

said lever having a first piece defining said handle portion and said first pivot means, having a second piece defining said bearing portion, and having connection means for interconnecting said first pivot means with said bearing portion, said connection means including a tang projecting from said first pivot means, said tang having a terminal end away from said first pivot means and an exterior surface defining a series of biased teeth formed on at least one side of said tang;

said bearing portion having an aperture for receiving said tang, said aperture having an interior wall with a series of biased teeth formed on at least one side of said wall for cooperating engagement with said teeth formed on said tang, said one side of said wall corresponding to said one side of said tang, said aperture being sized so that said tang is easily inserted therethrough and so that said cooperating teeth engage and prohibit the withdrawal of said tang from said aperture.

16. A mechanism as defined by claim 15 wherein said bearing portion is a generally L-shaped, flat bar member having a long leg extending from said second end to said connector means and having a short leg extending generally perpendicularly from said long leg in said second direction.

17. A mechanism as defined by claim 16 wherein said second pivot means includes a second pivot fulcrum and a second pivot seat.

18. A mechanism as defined by claim 17 wherein:

said second pivot fulcrum is a flange portion extending generally perpendicularly to said short leg at said terminal end;

the chair further includes a base plate through which the height control mechanism control button projects;

the base plate has a first aperture for receiving said flange portion and said short leg therethrough; and said flange and said short leg extend through said first aperture, said flange engaging said base plate to preclude the withdrawal of said short leg and said flange from said first aperture.

19. A mechanism as defined by claim 17 wherein said first pivot means includes a first pivot fulcrum and a first pivot seat.

20. A mechanism as defined by claim 19 wherein:

said first pivot fulcrum is defined by at least one shoulder portion extending perpendicularly from said tang portion and located away from said terminal end of said tang portion; and said base plate has a second aperture for slideably receiving said tang portion therethrough, said second aperture being located opposite the control button from said first aperture, said second aperture being sized sufficiently small so that said shoulder portion will not pass therethrough, but will engage the base plate, and said second aperture being sized sufficiently large so that said tang will freely pass therethrough.

*21. A control actuator as defined in claim 1 wherein said bearing portion includes a bearing surface that contacts the release member.*

*22. A control actuator as defined in claim 1 wherein said pivot means includes first and second spaced apart pivot members located on opposing sides of said bearing portion.*

*23. A control actuator as defined in claim 8 wherein said bearing portion includes a bearing surface that contacts the responsive device.*

*24. A control actuator as defined in claim 13 wherein said bearing portion includes a bearing surface that contacts the control button.*

*25. A control actuator as defined in claim 15 wherein said bearing portion includes a bearing surface that contacts the control button.*

*26. A control actuator as defined in claim 1 wherein said actuator lever comprises a multi-piece assembly.*

*27. A control actuator for actuating a release member of a chair height adjustment mechanism on a chair, said actuator comprising:*

*an actuator lever having a handle-supporting first end, an intermediate section and a second end;*

*a first pivot-forming structure on the chair for operably engaging said first end for pivoting said intermediate section in a predetermined direction when said handle-supporting first end is moved in a first direction to operate the release member; and*

*a second pivot-forming structure on the chair for operably engaging said second end for pivoting said intermediate section in said predetermined direction when said handle-forming first end is moved in a second direction, substantially opposite said first direction, to operate the release member.*

*28. In a chair of the type having a height adjustment mechanism with a release member, the improvement of a control actuator therefore, comprising:*

*an actuator lever having a handle-supporting first end, an intermediate section and a second end, said first end being operably supported on the chair for pivoting said intermediate section in a predetermined direction when said handle-supporting first end is moved in a first direction to operate the release member, and said second end being operably supported on the chair for pivoting said intermediate section in said predetermined direction when said handle-forming first end is moved in a second direction, substantially opposite said first direction, to operate the release member.*

*29. A control actuator as defined in claim 28 wherein said intermediate section is elongated and extends generally horizontally, and further is configured to move generally vertically when engaging the release member.*

*30. In a control actuator for activating a release member of a chair height adjustment mechanism in a chair control of the type having an elongated member extending outwardly from said chair control and terminating in a handle portion, the improvement comprising:*

*said control actuator being configured to activate said release member when said handle portion is moved in a first direction and also when said handle portion is moved in a second direction substantially opposite said first direction.*

*31. A control actuator as defined in claim 30 wherein said elongated member includes a lever configured to actuate the release member.*

*32. A control actuator as defined in claim 31 wherein said lever includes an intermediate section, said lever being operably supported on said chair control to move said intermediate section in a predetermined direction to actuate the release member when said handle portion is moved in either of said first and second directions.*

*33. A control actuator as defined in claim 32 wherein said intermediate section includes a bearing surface for applying a force to actuate the release member.*

*34. A control actuator as defined in claim 33 wherein said bearing surface is configured to contact the release member.*

*35. A control actuator as defined in claim 31 wherein the lever includes a pivot member for pivotally engaging a pivot-forming structure on the chair.*

*36. A control actuator as defined in claim 35 wherein said pivot member includes shoulders defining a pivot point.*

*37. A control actuator as defined in claim 32 wherein said intermediate section is elongated and extends generally horizontally, and further is configured to move generally vertically when engaging the release member.*

*38. A control actuator as defined in claim 30 wherein the release member is actuateable in only one direction, and wherein said elongated member includes a bearing surface configured to actuate the release member in the one direction when said elongated member is moved in either of said first and second directions.*

*39. A control actuator as defined in claim 38 wherein said bearing surface is configured to contact the release button.*

*40. A control actuator as defined in claim 31 wherein said lever comprises a multi-piece assembly.*

* * * * *